(12) United States Patent
Trochut

(10) Patent No.: US 8,779,741 B2
(45) Date of Patent: Jul. 15, 2014

(54) DC/DC CONVERTER CONTROLLED BY PULSE WIDTH MODULATION WITH HIGH EFFICIENCY FOR LOW OUTPUT CURRENT

(75) Inventor: Severin Trochut, Gilly sur Isere (FR)

(73) Assignee: ST-Ericsson SA, Geneva (CH)

( * ) Notice: Subject to any disclaimer, the term of this patent is extended or adjusted under 35 U.S.C. 154(b) by 710 days.

(21) Appl. No.: 12/075,878

(22) Filed: Mar. 13, 2008

(65) Prior Publication Data
US 2008/0224672 A1 Sep. 18, 2008

(30) Foreign Application Priority Data

Mar. 13, 2007 (FR) ...................................... 07 53795

(51) Int. Cl.
*G05F 1/565* (2006.01)
*G05F 1/595* (2006.01)

(52) U.S. Cl.
USPC ............................ 323/284; 323/271; 323/285

(58) Field of Classification Search
USPC .......................................... 323/271, 282–286
See application file for complete search history.

(56) References Cited

U.S. PATENT DOCUMENTS

| | | | | |
|---|---|---|---|---|
| 5,745,352 A | * | 4/1998 | Sandri et al. ..................... | 363/41 |
| 5,955,872 A | * | 9/1999 | Grimm ........................ | 323/283 |
| 6,294,903 B1 | | 9/2001 | Yamashita et al. | |
| 6,304,066 B1 | * | 10/2001 | Wilcox et al. .................. | 323/282 |
| 6,492,794 B2 | * | 12/2002 | Hwang ......................... | 323/285 |
| 7,327,127 B2 | * | 2/2008 | Ho .............................. | 323/271 |
| 7,446,519 B2 | * | 11/2008 | Low et al. ....................... | 323/285 |
| 7,888,918 B2 | * | 2/2011 | Wu et al. ....................... | 323/224 |
| 2004/0022078 A1 | * | 2/2004 | Shieh .............................. | 363/49 |
| 2004/0104714 A1 | | 6/2004 | Nishimaki | |
| 2005/0040797 A1 | * | 2/2005 | Sanchez De Castro et al. ............................. | 323/271 |
| 2005/0046399 A1 | * | 3/2005 | Gan et al. ...................... | 323/222 |
| 2005/0077884 A1 | * | 4/2005 | Krug et al. .................... | 323/282 |
| 2005/0206360 A1 | * | 9/2005 | Mehas et al. .................. | 323/282 |
| 2006/0041770 A1 | | 2/2006 | Lougee | |
| 2006/0164057 A1 | * | 7/2006 | Kudo et al. .................... | 323/282 |
| 2006/0171178 A1 | * | 8/2006 | Shvarts .......................... | 363/65 |
| 2009/0033299 A1 | * | 2/2009 | Ishino ........................... | 323/282 |

FOREIGN PATENT DOCUMENTS

WO 2006/036001 4/2006
WO WO 2007007539 A1 * 1/2007

OTHER PUBLICATIONS

French Search Report for Application Serial No. FR0753795, INPI (Institut National De La Propriete Industrielle), Paris, Dec. 5, 2007.

* cited by examiner

*Primary Examiner* — Adolf Berhane
*Assistant Examiner* — Fred E Finch, III
(74) *Attorney, Agent, or Firm* — Coats and Bennett, P.L.L.C.

(57) ABSTRACT

A DC voltage converter produces an output voltage (VS) at an output terminal from an energy source. The DC voltage convert includes a selector switch includes a first input coupled to the energy source, a second input coupled to a ground, and an output coupled to a first terminal of an inductor. A second terminal is coupled to the output terminal of the converter and a capacitor is coupled between the output terminal and the ground. A regulator produces a control signal as a function of a result of a comparison of the output voltage with a reference voltage. A control circuit couples the output of the selector switch to the first or second input of the selector switch, as a function of the control signal. The converter may also include a means of inhibition adapted to inhibiting the control circuit when a current flowing in the inductor gets cancelled.

31 Claims, 2 Drawing Sheets

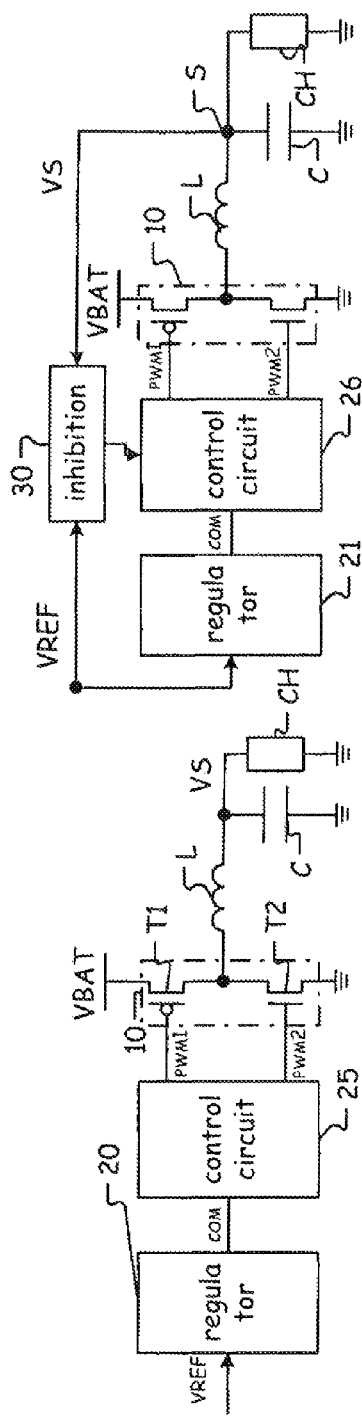
Figure 1 (prior art)
Figure 4 (prior art)
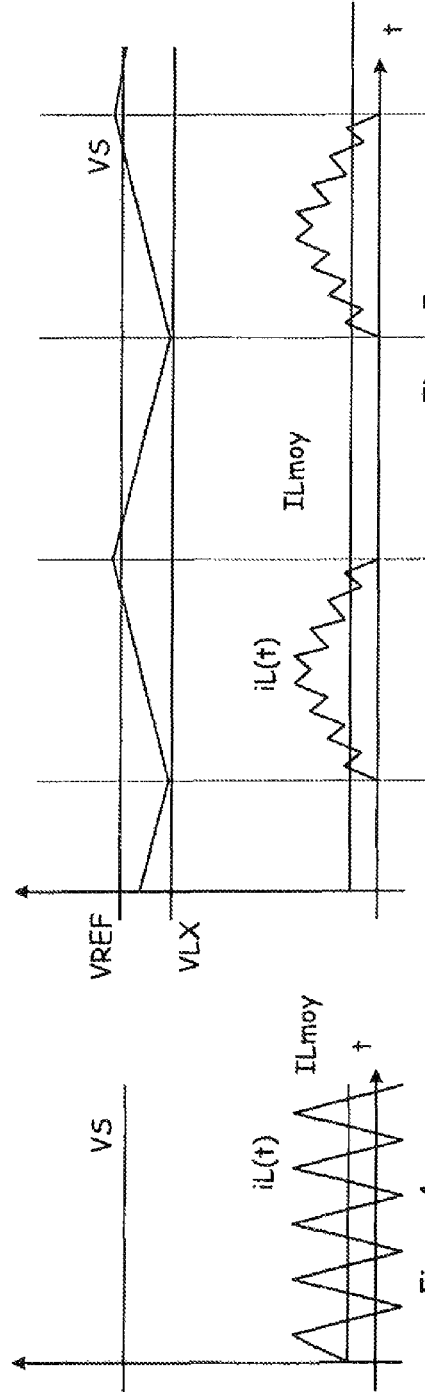
Figure 2
Figure 5

DC/DC CONVERTER CONTROLLED BY PULSE WIDTH MODULATION WITH HIGH EFFICIENCY FOR LOW OUTPUT CURRENT

PRIORITY CLAIM

This application claims priority from French patent application No. 0753795, filed Mar. 13, 2007, which is incorporated herein by reference.

TECHNICAL FIELD

An embodiment relates to an inductive DC/DC type voltage converter adapted to supplying an output current to a load in the form of an output voltage that is different from the supply voltage received.

DC/DC converters are very widely used whenever a regulated voltage needs to be provided. For example, such converters are used to provide an electronic circuit with a regulated power voltage from an energy source such as an accumulator whose output voltage can vary according to the load of said accumulator. Such converters are thus for example used in mobile telephony, laptops, personal digital assistants, video or audio data players, etc., or else in the field of medical prosthetic devices, audio prosthetic devices, cardiac prosthetic devices, etc.

BACKGROUND

FIG. 1 shows a prior art regulated inductive DC/DC converter producing an output voltage VS from an energy source VBAT and comprising:
- a selector switch 10 comprising a first input coupled to the energy source VBAT, a second input coupled to a ground GND, and an output coupled to a first terminal of an inductor L, a second terminal of which is coupled to an output terminal S of the converter to which a load CH and a capacitor C are parallel-coupled,
- a regulator 20 to produce a control signal COM as a function of a result of a comparison of an output voltage VS with a reference voltage VREF,
- a control circuit 25 to couple the output of the selector switch 10 to the first or second input of the selector switch, as a function of the control signal COM.

The selector switch 10 comprises in practice two switches T1, T2 series-coupled between the first input and the second input of the selector switch, a common point of the switches T1, T2 forming the output of the selector switch.

From the signal COM received from the regulator 20, the control circuit 25 produces two control signals PWM1, PWM2 suited to controlling the switches T1, T2 of the selector switch so as to impose the voltage VBAT on the first terminal of the inductor for a time T0 and impose the voltage GND on the first terminal of the inductor for a time T-T0. The inductor L and the capacitor C thus store energy during the time T0 and restore it during the time T-T0. The current given by the inductor to the load is proportional to the cyclical ratio T0/T. The capacitor C is used to maintain the output voltage VS at a constant level.

For the control of the selector switch, the regulator uses a pulse-width modulation (PWM) which causes the cyclical ratio T0/T to vary. If the output voltage is lower than the reference voltage, the cyclical ratio increases. Inversely, if the output voltage is greater than the reference voltage, the cyclical ratio falls.

A converter of this kind works in a continuous mode of operation when the current flowing in the inductor L is never cancelled out during a period T. This is the case especially when the current given to the load is substantial or when the quantity of energy given to the load is substantial. The converter works in a discontinuous mode of conduction when the current in the inductor gets cancelled out during a part of the period T. This is the case especially when the quantity of energy required by the load is low enough to be transmitted to the load in less than one change-over switching period T.

A converter such as this has high efficiency, of the order of 90 to 98%, especially when the output current given to the load is in a range of about 30% to 70% of a maximum current IM for which the converter has been sized.

However, the efficiency of the converter may fall sharply when the output current diminishes and becomes low or very low when it is of the order of some milliamperes. The efficiency of the converter is thus, for example, of the order of 30% to 40% when the output current is below 30% of the maximum current IM. This is due to the fact that the switching losses in the selector switch become non-negligible relative to the energy given to the load with low output current.

SUMMARY

An embodiment is a converter that does not have this drawback.

Thus, an embodiment pertains to a DC voltage converter, which furthermore is compliant with a prior-art converter described in the above introduction and also comprises an inhibition means suited to inhibiting the control circuit when the current flowing in the inductor gets cancelled.

Inhibiting the operation of the control circuit when the current flowing in the inductor gets cancelled also causes the working of the selector switch situated downstream from the control circuit to get inhibited. The current in the inductor is kept at zero and cannot get inverted: thus, losses in the power stage (selector switch, inductor and capacitor) are limited. Thus, when the output current is low, the efficiency of a converter of an embodiment is appreciably greater than the efficiency of a known same type of converter.

The inhibition means may also be suited to keeping the control circuit inhibited so long as the output voltage is greater than a predefined value below the reference voltage; the predefined value is for example of the order of 0.7 to 0.99 times the reference voltage. In other words, in a converter of an embodiment, a small drop in the output voltage is permitted (when the working of the regulator is inhibited) up to the predefined value. This prevents an excessively frequent re-starting of the selector switch and thus limits the switch-over losses in the selector switch.

The control circuit is inhibited by isolating the output of the selector switch from the first input and from the second input of the selector switch. Thus, the output of the selector switch is left in a floating state, the current flowing in the inductor cannot get inverted and flows through the ground by means of the selector switch. Thus, an unnecessary discharge to ground of the capacitor C is prevented.

The selector switch comprises for example, as in prior-art converters, two power switches controlled by the regulator and series-coupled between the first input and the second input of the selector switch, a common point of the two switches forming the output of the selector switch. The two switches are controlled by the control circuit as a function of the control signal COM given by the regulator and an inhibition signal given by the inhibition means. In this case, when it is inhibited, the control circuit produces appropriate control signals to keep the two power switches open: the output of the selector switch is thus cut off from the first and second inputs of the selector switch.

In a first embodiment, the cancellation of the current flowing in the inductor is detected by measurement of the current flowing in the inductor. In a second embodiment, the cancellation of the current flowing in the inductor is detected by detecting the fact that the voltage present between the first terminal of the inductor (coupled to the output of the selector switch) and a ground of the circuit becomes positive when the second switch is closed. Said voltage represents the direction of the current in the inductor, as shall be seen further below in the detailed description.

Just as in a prior-art regulator, the regulator of an embodiment may include a filter and a comparator.

A regulator according to an embodiment may also include a means to short-circuit the filter when the working of the control circuit is inhibited.

The short-circuiting of the filter may be used, at the re-starting of the selector switch, when the control circuit is no longer inhibited, to position the error signal at a value sufficient to immediately increase the current in the inductor and in the load but not to an excessive extent to prevent deleterious current spikes in the load. Furthermore, when the filter is short-circuited, active elements (impedances, amplifier, etc.) of the filter are inhibited (or put into a working mode known as a "low consumption" mode) and unnecessary energy losses in the filter are prevented when the working of the regulator is inhibited.

BRIEF DESCRIPTION OF THE DRAWINGS

The present disclosure will be understood more clearly and other features and advantages shall appear from the following detailed description of an exemplary embodiment of a converter according to the present disclosure. The description is made with reference to the appended drawings of which:

FIG. 1, already described, is a block diagram of a known converter,

FIG. 2 is a block diagram of a converter according to an embodiment,

FIG. 4 shows the progress, as a function of time, of some of the currents and voltages within a converter according to FIG. 1, and FIG. 5 shows the progress, as a function of time, of certain currents and voltages within a converter according to an embodiment of FIG. 2.

DETAILED DESCRIPTION

Figure 3:
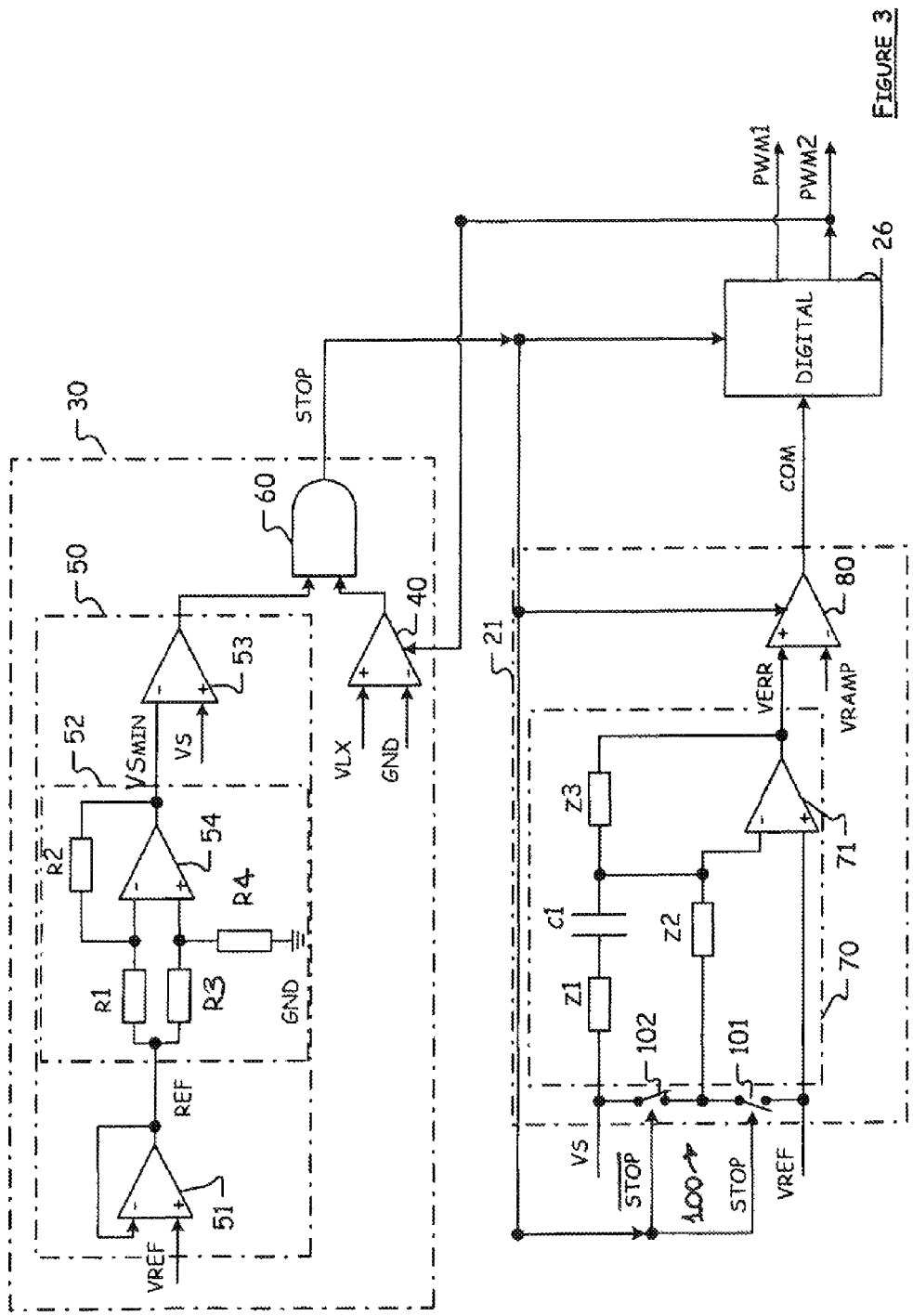
FIG. 3 is an electronic diagram giving a detailed view of certain elements of the converter of FIG. 2 according to an embodiment.

As stated here above, a prior-art converter comprises (FIG. 1):
 a selector switch 10 comprising a first input coupled to the energy source VBAT, a second input coupled to a ground GND, and an output coupled to the first terminal of an inductor L a second terminal of which is coupled to the output terminal (S) of the converter, a capacitor C being coupled between the output terminal S and the ground,
 a regulator 20 to produce a control signal COM as a function of a result of comparison of the output voltage VS with a reference voltage VREF,
 a control circuit 25 to couple the output of the selector switch 10 to the first input or to the second input of the selector switch as a function of the control signal COM.

The selector switch 10 comprises two power switches T1, T2 series-coupled between the first input and the second input of the selector switch, a common point of the two switches forming the output of the selector switch, the two switches being controlled by the control circuit as a function of the control signal COM given by the regulator.

A filter 70 (FIG. 3) produces a signal whose voltage VERR is a function of the difference between the desired output voltage VREF and the real output voltage VS: VERR=A·(VREF−B·VS). A, B are transfer functions depending on the elements (impedances, active elements, etc.) forming the filter.

The comparator 80 comprises a first input coupled to the output of the filter 70 at which the voltage VERR is produced, a second input to which the reference error VRAMP is applied. VRAMP is a saw-toothed voltage, i.e. a periodic voltage with a triangular form on each period. On a period T of the signal VRAMP, the comparator 80 produces:
 a signal COM that is active when VERR is higher than VRAMP during a period T0,
 a signal COM that is inactive when VERR is lower than VRAMP during a time T−T0.

The cyclical ratio T0/T is looped in a feedback to give the current desired by the load at output of the converter. The cyclical ratio T0/T can be adjusted by adjusting either the transfer function A of the filter or the amplitude of the reference error VRAMP.

From the control signal COM produced by the regulator 20, the control circuit 25 produces two control signals PWM1, PWM2 that are suited to controlling the switches T1, T2 such that:
 when COM is active (equal to VBAT), T1 is closed (PWM1 active) and T2 is open (PWM2 inactive),
 when COM is inactive (equal to GND), T1 is open (PWM1 is inactive) and T2 is closed (PWM2 active).

The converter of FIG. 2 according to an embodiment is distinguished from the prior-art converter of FIG. 1 by the fact that:
 it also includes an inhibition means 30,
 the regulator 20 and the control circuit 25 are replaced by circuits 21, 26 having the same function but able to be inhibited by the inhibition means 30.

The inhibition means 30 is suited to inhibiting the control circuit 26 when a current gets cancelled in the converter L. In the converter of FIGS. 2, 3, cancellation of a current is detected by detection of the fact that the voltage VLX present at the first terminal (the terminal coupled T1 and T2) of the inductor L gets cancelled (i.e., is no longer below zero) when the second switch T2 is closed.

Indeed, when the switch T2 is closed, a cancellation of the current in the inductor takes place when the energy required by the load during a period T has been entirely given by the source VBAT or the capacitor C. The closed switch T2 behaves like a resistor (equal to the internal resistance of the switch). When the current flows from the ground through the switch T2 and the inductor L towards the load, the voltage VLX at the drain of the transistor T2 is negative. When the current changes its direction of flow in the inductor, the current flows from the capacitor C through the inductor L and the switch T2 and flows towards the ground. The voltage VLX at the drain of the switch T2 becomes positive. The value of the voltage VLX thus represents the direction of the current flowing in the inductor L when the switch T2 is closed.

To detect the fact that the voltage VLX is positive when the switch T2 is closed, the inhibition means 30 comprises a first inhibition circuit such as a comparator 40 comprising a first data input coupled to the first terminal of the inductor L to receive the voltage VLX, a second data input coupled to the ground to receive the voltage GND, a third activation input coupled to a control input of the switch T2 to receive the signal PWM2 and an output at which there is produced the result of the comparison of VLX with GND when the comparator 40 is activated by the signal PWM2.

The inhibition means 30 is also adapted to keeping the control circuit 26 inhibited so long as the output voltage VS is greater than a predefined value VSMIN lower than the reference voltage VREF, for example approximately ranging from 0.7 to 0.99 times the reference voltage. This enables a certain flexibility in the management of the regulation of the output voltage VS. By permitting a drop in the output voltage (control circuit inhibited so long as VS remains between the predefined value VSMIN and VREF), excessively frequent instances of restarting the control circuit are avoided and thus, the number of change-over switching operations of the switches of the selector switch 10 are limited and thus commutation losses in the selector switch 10 are limited.

To this end, an embodiment of the means 30 comprises a second inhibition circuit 50 comprising, in the detailed example of FIG. 3, the following elements: a follower amplifier 51, a computation circuit 52 and a comparator 53. The amplifier 51 is an operational amplifier having one output coupled to a negative input (follower assembly), the voltage VREF being applied to a positive input. The amplifier 51 produces the low-impedance voltage VREF at its output to give the necessary current to the computation circuit 52 which it powers. At its output, the computation circuit 52 produces a voltage VSMIN equal to a fraction of the voltage VREF applied to its input. The voltage VSMIN corresponds to the minimum value acceptable for the output voltage VS of the converter. The circuit 52 is a voltage divider comprising:
- an operational amplifier 54,
- a first resistor R1 coupled between the output of the amplifier 51 (at which VREF is produced) and a first input (negative) of the amplifier 54,
- a second resistor R2, coupled between the first (negative) input of the amplifier 54 and an output of the amplifier 54 at which the voltage VSMIN is produced,
- a third resistor R3, coupled between the output of the amplifier 51 and the second (positive) input of the amplifier 54,
- a fourth resistor R4, coupled between the second (positive) input of the amplifier 54 and the ground GND.

Assuming that the operational amplifier 54 is ideal and noting the current flowing in the resistors R1, R2 as i1 and the current flowing in the resistors R3, R4 as i2, the electrical equations linking the voltages and the currents in the circuit 52 are written as follows:

$$VREF = (R1 + R2) \cdot i1$$
$$= R1 \cdot i1 + R3 \cdot i2$$
$$= (R1 + R2) \cdot i1 + VSMIN$$

We deduce therefrom:

$$VSMIN/VREF = 1 - (R4 \cdot (R1+R2))/(R1 \cdot (R3+R4))$$

In choosing for example:

$$R2 = x \cdot R1, R3 = R1 \text{ and } R4 = R2$$

we obtain:

$$VSMIN/VREF = 1 - x$$

In choosing x so that it ranges approximately between 0.01 and 0.3, we obtain VSMIN approximately between 0.7·VREF and 0.99·VREF.

The comparator 53 for its part comprises a first input coupled to the output of the amplifier 54 at which there is produced the voltage VSMIN (corresponding to the second predefined value), a second input coupled to the output of the converter at which the voltage VS is produced. The comparator produces a signal that is active if VS>VSMIN. In other words, the working of the regulator is inhibited so long as VS>VSMIN.

Finally, the inhibition means 30 comprises a logic gate 60, of an AND type in the example of FIG. 3, comprising a first input coupled to the output of the first inhibition circuit (the comparator 40), a second input coupled to the output of the second inhibition circuit 50 and an output at which there is produced a signal STOP used to inhibit the operation of the regulator 20. The signal STOP is active:
- when the comparator 40 produces an active signal, i.e. when VLX becomes greater than GND when the switch T2 is on, or
- when the comparator 50 produces an active signal, i.e. so long as VS is greater than its minimum acceptable value VSMIN.

In a converter according to an embodiment, the control circuit 26 differs from a prior-art control circuit 25 in that when the control circuit 26 is inhibited by the active signal STOP received by the inhibition means 30, the circuit 26 products signals PWM1, PWM2 that are inactive: the output of the selector switch 10 is thus cut off from the first input and second input of the selector switch. In other words, in the converter of FIGS. 2, 3:
- when the control circuit 26 is inhibited by a signal STOP given by the inhibition means 30, it produces inactive signals PWM1, PWM2 so that the switches T1 and T2 are open,
- when the control circuit 26 is not inhibited by the means 30, it is active and produces signals PWM1, PWM2 that are active or inactive according to the signal COM, just as in the case of the known control circuit 25.

In the converter of FIG. 3, the inhibition means is also adapted to inhibiting the comparator 80 when the control circuit is inhibited. To this end, the signal STOP produced by the means 30 is also applied to an inhibition input of the comparator 80. Thus, unnecessary energy consumption by the comparator 80 when the control circuit is inhibited is prevented.

Finally, the regulator of FIG. 3 comprises a means 101, 102 to short-circuit the filter 70 when the working of the control circuit 26 is inhibited (STOP active). When the working of the control circuit 26 is no longer inhibited (STOP inactive), the short-circuit means 101, 102 is no longer active and the filter recovers normal operation.

In the example of FIG. 3, the regulator 21 comprises:
- a filter 70 to determine an error VERR between the output voltage VS and the reference voltage VREF,
- a comparator 80 to produce the control signal COM as a function of a result of comparison of the determined error VERR with a triangular and periodic reference error VRAMP.

In the detailed example of FIG. 3, the filter 70 comprises:
- an amplifier 71 comprising a first input (positive in this case) to which the reference voltage VREF is applied,
- a first impedance Z1 and a capacitor C1 series-coupled between the output of the converter at which the voltage VS is produced and a second input (negative here) of the amplifier 71, a second impedance Z2 comprising a first terminal coupled to the second input of the amplifier 71, a third impedance Z3 comprising a first terminal coupled to the second input of the amplifier 71 and a second terminal coupled to an output of the amplifier 71.

In the example of FIG. 3, the means 100 for short-circuiting the filter 70 comprises two switches 101, 102 controlled by the signal STOP. The first switch 101 comprises a first data input coupled to the first input of the comparator 71, a second data input coupled to a second terminal of the impedance Z2 and a closing control input to which the signal STOP is applied. The second switch comprises a first data input coupled to the second terminal of the impedance Z2, a second data input coupled to the output of the converter and an opening control input to which the signal STOP is applied.

When the signal STOP is inactive, the switch 101 is open and the switch 102 is closed; in this case, the signal VERR is equal to A·(VREF−B·VERR), A and B being transfer functions dependent on Z1, Z2, Z3, C1 and the amplifier 71.

When the signal STOP is active, the switch 101 is closed and the switch 102 is open; in this case, the signal VERR is equal to C·VS+D, C, D being transfer functions depending on Z1, Z2, C1.

The utility of the means 100 is that, at the instant when the signal STOP becomes inactive, the signal VERR at output of the error detector is still a function of VS (C·VS−D) because a small transition period is necessary for the amplifier 71 to compute the error VERR=A·(VREF−VS). In choosing Z1, Z2 and C1 appropriately, at the instant when the signal STOP becomes inactive, the error VERR (a function of VS) is great enough to produce an active signal COM during a part of the period T, but not great enough to produce a signal COM that is active throughout the period T. This enables a re-starting of the power circuit (selector switch, inductor, capacitor) that is not too sudden, with a cyclical ratio of less than 100%; thus, possible current spikes during the first cycles are limited. Without the means 100, when the signal STOP becomes inactive, the signal VERR may be much lower than VRAMP so that the signal COM is active throughout the period T during the first cycles, leading to current spikes at the level of the load.

The means 100 may also be adapted for the inhibition (or placing in an operating mode known as "low consumption" mode) of the active elements (impedance, amplifier, etc.) of the filter 70. This prevents unnecessary energy losses in the filter when the working of the regulator 21 is inhibited.

The working of a prior-art converter is shown in FIG. 4. When operating in a steady state, the regulator 20 and more specifically the comparator 80 produces a square-wave signal (equal to GND during the time T0, then equal to VBAT during T−T0) that is suited to controlling the selector switch 10 so that the voltage VS remains constant. The voltage at the terminals of the inductor is equal to VL=VBAT−VS during the period T0 and to VL=−VS during the period T−T0. The current in the inductor IL(t) is obtained by the relationship VL=L·di(t)Idt where VL is the voltage across the terminals of the inductor L. The instantaneous current in the inductor thus has a triangular form similar to that of the reference error signal VRAMP. The mean current in the inductor ILmoy is constant under steady-state load conditions.

As can be seen in FIG. 4, in a prior-art converter, the instantaneous current in the inductor has a triangular shape and, for a low output current, the mean current in the inductor ILmoy is low and the instantaneous current IL(t) in the inductor is liable to invert and become negative. Now, if the instantaneous current in the inductor changes direction and becomes negative, the output capacitor gets discharged and the current flows towards the ground by means of the second switch T2 of the selector switch 10. This leads to an increase in losses and a drop in efficiency since the energy lost by the capacitor must be supplied again at the next cycle.

The operation of a converter according to an embodiment is shown in FIG. 5. The control circuit becomes active as soon as the output voltage becomes lower than the predefined value VSMIN and it is inhibited as soon as the current in the inductor gets cancelled (i.e.,) equals zero before starting to flow through T2 to ground. Thus, this entails monitoring both the restarting instants of the control circuit to prevent excessively frequent re-starting operations and the working time of the control circuit to limit the losses at low output current. The instantaneous current IL(t) flowing in the inductor gets cancelled during one period when the control circuit is inhibited, but the current IL(t) does not become substantially negative, even when the current ILmoy is low or very low.

A power-supply according to an embodiment may form part of a system, such as a computer system.

From the foregoing it will be appreciated that, although specific embodiments have been described herein for purposes of illustration, various modifications may be made without deviating from the spirit and scope of the present disclosure.

What is claimed is:

1. A DC voltage converter producing an output voltage at an output terminal from an energy source, the converter comprising:
   a selector switch comprising a first input coupled to the energy source, a second input coupled to a ground, and an output coupled to a first terminal of an inductor, a second terminal of which is coupled to the output terminal of the converter, a capacitor being coupled between the output terminal and the ground;
   a regulator to produce a control signal as a function of a result of a comparison of the output voltage with a reference voltage;
   a control circuit to couple the output of the selector switch to the first or second input of the selector switch, as a function of the control signal; and
   an inhibition circuit comprising a voltage comparator operable to control the regulator to place the DC voltage converter in a low power consumption mode of operation by inhibiting the production of the control signal when a voltage at the output of the selector switch exceeds a threshold voltage level, the inhibition circuit further adapted to keeping the control circuit inhibited so long as the output voltage is greater than a predefined value lower than the reference voltage;
   wherein the inhibition circuit reduces energy consumption in the regulator in the low power consumption mode over the duration from when the comparator detects no output current in the inductor until the output voltage falls a predefined amount below the reference voltage.

2. A converter according to claim 1, wherein the predefined value is equal to 0.7 to 0.99 times the reference voltage.

3. A converter according to claim 1 wherein, when the control circuit is inhibited, the output of the selector switch is cut off from the first and second inputs of the selector switch.

4. A converter according to claim 1, wherein the selector switch comprises two power switches series-coupled between the first input and the second input of the selector switch, a common point of the two switches forming the output of the selector switch, the two switches being controlled by the control circuit as a function of the control signal.

5. A converter according to claim 4, wherein the voltage comparator inhibits the production of the control signal when a voltage at the output of the selector switch becomes positive when the second switch is closed.

6. A converter according to claim 5, wherein the regulator also includes a means to short-circuit the filter when the working of the control circuit is inhibited.

7. A converter according to claim 1, wherein the regulator comprises:
   a filter to determine an error between the output voltage and the reference voltage; and
   a comparator to produce the control signal as a function of a result of comparison of the determined error with a triangular reference error.

8. A converter according to claim 7, wherein the inhibition circuit is also adapted to inhibiting the comparator when the control circuit is inhibited.

9. A power-supply controller, comprising:
   a regulator operable to generate a control signal in response to a reference signal and to generate an output signal on an output node of a power-supply phase;
   a control circuit operable to generate at least one switching signal in response to the control signal, the switching signal operable to cause a switching circuit to alternately couple an input node of the power-supply phase to a first supply node and to a second supply node; and
   an inhibitor operable to inhibit the regulator from generating the control signal and to cause the control circuit to terminate switching of the switching signal in a low power consumption mode entered in response to a voltage level at the input node of the power-supply phase being greater than a predetermined threshold voltage level, and exited in response to the output voltage being less than a predefined value lower than the reference voltage.

10. The power-supply controller of claim 9 wherein the regulator comprises:
    an amplifier circuit operable to generate an error signal in response to the output signal and a reference signal; and
    a comparator operable to generate the control signal in response to the error signal and a ramp signal.

11. The power-supply controller of claim 9 wherein the control circuit is operable to generate first and second switching signals, the first switching signal being approximately 180° out of phase relative to the second switching signal.

12. The power-supply controller of claim 9 wherein the inhibitor is further operable to cause the control circuit to generate no switching signal in response to the output signal having a particular relationship to a reference signal.

13. The power-supply controller of claim 9 wherein the inhibitor is operable to allow the control circuit to resume generating the switching signal in response to the output signal having a particular relationship to a reference signal.

14. The power-supply controller of claim 9 wherein the inhibitor is operable to prevent the switching signal from having a 100% duty cycle for a period of time after the control circuit is no longer inhibited from generating the at least one switching signal.

15. The power-supply controller of claim 9 wherein the inhibitor is also operable to cause the control circuit to cause the switching circuit to uncouple the input node of the power-supply phase from at least one of the first and second supply nodes in response to the voltage level at the input node of the power-supply phase being greater than the predetermined threshold voltage level.

16. The power-supply controller of claim 9 wherein the inhibitor is also operable to cause the control circuit to cause the switching circuit to uncouple the input node of the power-supply phase from the first and second supply nodes in response to the voltage level at the input node of the power-supply phase being greater than the predetermined threshold voltage level.

17. The power-supply controller of claim 9 wherein the predetermined threshold voltage value approximately equals zero.

18. The power-supply controller of claim 9, further comprising a detector operable to determine that the voltage level at the input node of the power-supply phase is greater than the predetermined threshold voltage level by comparing the voltage at the input node of the power-supply phase only while the input node is coupled to the one of the first and second supply nodes that is coupled to a supply having the lower absolute value.

19. A power-supply controller, comprising:
    a regulator operable to generate a control signal in response to a reference signal and to an output signal on an output node of a power-supply phase, wherein the regulator further comprises:
    a filter circuit operable to generate an output error signal having a value that is a function of the difference between the output signal and a reference signal, the filter circuit including switching circuitry operable in a low consumption mode to generate the output error signals having a value that is a function of the output signals and to disable operation of components in the filter to reduce power consumption in the low consumption mode of operation; and
    a comparing circuit operable to generate the control signal responsive to the output error signal and a varying reference signal and operable in the low consumption mode to terminate generation of the control signal;
    a control circuit operable to generate at least one switching signal in response to the control signal, the switching signal operable to cause a switching circuit to alternately couple an input node of the power-supply phase to a first supply node and a second supply node; and
    an inhibitor operable to control the regulator to place the filter and comparing circuits in the low consumption mode of operation and terminate generation of the control signal in response to a phase current that is less than a threshold value flowing through the phase from the input node to the output node.

20. A power supply, comprising:
    a power-supply phase having an input node and having an output node operable to provide a regulated output signal;
    a switching circuit coupled to first and second supply nodes and to the input node of the power-supply phase;
    a regulator operable to generate a control signal in response to a reference signal and to the output signal;
    a control circuit operable to generate at least one switching signal in response to the control signal, the switching signal operable to cause the switching circuit to alternately couple the input node of the power-supply phase to the first and second supply nodes; and
    an inhibitor operable to generate a stop signal to control the regulator to stop generation of the control signal and to cause the control circuit to generate no switching signal in response to a phase current that is greater than or equal to a threshold value flowing through the power-supply phase from the output node to the input node, wherein the inhibitor further comprises:
    a first inhibition circuit adapted to receive a reference voltage, a voltage on the input node of the power-supply phase, and the switching signal, the first inhibition circuit operable to generate a first inhibition signal that is active when the voltage on the input node of the power-supply phase is less than the reference voltage and the switching signal causes the switching circuit to couple the input node of the power-supply to the second supply node;

a second inhibition circuit adapted to receive a minimum output voltage reference and an output voltage on the output node of the power-supply phase, and operable to generate a second inhibition signal that is active when the output voltage on the output node of the power-supply phase is less than the minimum output voltage reference; and logic circuitry coupled to the first and second inhibition circuits to receive the first and second inhibition signals and operable to drive the stop signal active when either the first or second inhibition signal goes active.

21. The power supply of claim 20 wherein the power-supply phase comprises:
an inductor coupled between the input and output nodes; and
a capacitor coupled between the output node and one of the first and second supply nodes.

22. The power supply of claim 20 wherein the switching circuit comprises:
a first switch having a first conduction node coupled to the first supply node, a second conduction node coupled to the phase input node, and a control node coupled to receive the at least one switching signal; and
a second switch having a first conduction node coupled to the second supply node, a second conduction node coupled to the phase input node, and a control node coupled to receive the at least one switching signal.

23. The power supply of claim 20 wherein:
the control circuit is operable to generate first and second switching signals in response to the control signal; and
the switching circuit comprises:
a first switch having a first conduction node coupled to the first supply node, a second conduction node coupled to the phase input node, and a control node coupled to receive the first switching signal; and
a second switch having a first conduction node coupled to the second supply node, a second conduction node coupled to the phase input node, and a control node coupled to receive the second switching signal.

24. The power supply of claim 20 wherein the switching circuit comprises:
a first transistor having a first conduction node coupled to the first supply node, a second conduction node coupled to the phase input node, and a control node coupled to receive the at least one switching signal; and
a second transistor having a first conduction node coupled to the second supply node, a second conduction node coupled to the phase input node, and a control node coupled to receive the at least one switching signal.

25. The power supply of claim 20 wherein the regulator, control circuit, and inhibitor are disposed on a same integrated-circuit die.

26. The power supply of claim 20 wherein the switching circuit, regulator, control circuit, and inhibitor are disposed on a same integrated-circuit die.

27. The power supply of claim 20 wherein:
the regulated output signal comprises a regulated output voltage;
the control signal comprises a control voltage; and
the at least one switching signal comprises an at least one switching voltage.

28. A system, comprising:
a power supply, comprising:
a power-supply phase having an input node and having an output node operable to provide a regulated output signal;
a switching circuit coupled to first and second supply nodes and to the input node of the power-supply phase;
a regulator operable to generate a control signal in response to a reference signal and to the output signal;
a control circuit operable to generate at least one switching signal in response to the control signal, the switching signal operable to cause the switching circuit to alternately couple the input node of the power-supply phase to the first and second supply nodes; and
an inhibitor operable to generate a stop signal to inhibit the regulator from generating the control signal and to cause the control circuit to generate no switching signal in response to a phase current that is greater than or equal to a threshold value flowing through the power-supply phase from the output node to the input node, wherein the inhibitor further comprises:
a first inhibition circuit adapted to receive a reference voltage, a voltage on the input node of the power-supply phase, and the switching signal, the first inhibition circuit operable to generate a first inhibition signal that is active when the voltage on the input node of the power-supply phase is less than the reference voltage and the switching signal causes the switching circuit to couple the input node of the power-supply to the second supply node;
a second inhibition circuit adapted to receive a minimum output voltage reference and an output voltage on the output node of the power-supply phase, and operable to generate a second inhibition signal that is active when the output voltage on the output node of the power-supply phase is less than the minimum output voltage reference; and
logic circuitry coupled to the first and second inhibition circuits to receive the first and second inhibition signals and operable to drive the stop signal active when either the first or second inhibition signal goes active; and
a load coupled to the phase output node.

29. The system of claim 28 wherein the load and at least one of the power-supply phase, switching circuit, regulator, control circuit, and inhibitor are disposed on a same integrated-circuit die.

30. A method, comprising:
generating one or more switching signals in response to one or more control signals, the one or more switching signals, while being generated, causing an input node of a power-supply phase to be alternately coupled to first and second supply voltages;
detecting a current flowing through the power-supply phase by comparing a voltage level corresponding to the current flow to a first threshold voltage level; and
ceasing switching of all of the one or more switching signals and ceasing generation of all of the one or more control signals in response to a magnitude of a forward current flowing through the power-supply phase being below or equal to a second threshold, or in response to a voltage at the output of the power-supply phase being less than a predetermined amount below a reference voltage;
such that the generation of control signals and the switching of switching signals is suppressed during a low power consumption mode lasting from detection of a zero power-supply phase current until detection of the output voltage decreasing to the predetermined amount below a reference voltage.

31. The method of claim 30 wherein the first threshold approximately equals zero.

* * * * *